(12) United States Patent
Escobar et al.

(10) Patent No.: US 10,361,407 B1
(45) Date of Patent: Jul. 23, 2019

(54) INTERFACE BETWEEN ELECTRODES AND BATTERY TERMINAL

(71) Applicant: QUALLION LLC, Sylmar, CA (US)

(72) Inventors: Michael Escobar, Pasadena, CA (US);
Grant Farrell, Valencia, CA (US);
Kevin Pope, Sun Valley, CA (US);
Hiroshi Nakahara, Santa Clarita, CA (US); Somadatta Mohanty, Los Angeles, CA (US)

(73) Assignee: Quallion LLC, Sylmar, CA (US)

( * ) Notice: Subject to any disclaimer, the term of this patent is extended or adjusted under 35 U.S.C. 154(b) by 490 days.

(21) Appl. No.: 15/145,713

(22) Filed: May 3, 2016

(51) Int. Cl.
*H01M 10/0525* (2010.01)
*H01M 2/06* (2006.01)
*H01M 2/30* (2006.01)
*H01M 2/08* (2006.01)

(52) U.S. Cl.
CPC .............. *H01M 2/06* (2013.01); *H01M 2/08* (2013.01); *H01M 2/30* (2013.01); *H01M 10/0525* (2013.01)

(58) Field of Classification Search
CPC ............ H01M 2/06; H01M 2/08; H01M 2/30; H01M 10/0525
See application file for complete search history.

(56) References Cited

U.S. PATENT DOCUMENTS

| 2013/0004834 | A1* | 1/2013 | Jiang | ....................... H01M 2/06 429/181 |
| 2015/0180004 | A1* | 6/2015 | Harayama | ............... H01M 2/06 429/158 |

* cited by examiner

*Primary Examiner* — Lingwen R Zeng
(74) *Attorney, Agent, or Firm* — Gavrilovich, Dodd & Lindsey, LLP

(57) ABSTRACT

An electrical energy storage device has electrodes positioned in a case. A feedthrough pin extends through a portion of the case. A sealant surrounds the feedthrough pin and contacts a component of the device. A seal activator is received in the sealant such that the pressure that the sealant applies to the component increases above the level of pressure that the sealant applies to the component before the sealant activator is received in the sealant. In some instances, the component is the feedthrough pin.

19 Claims, 13 Drawing Sheets

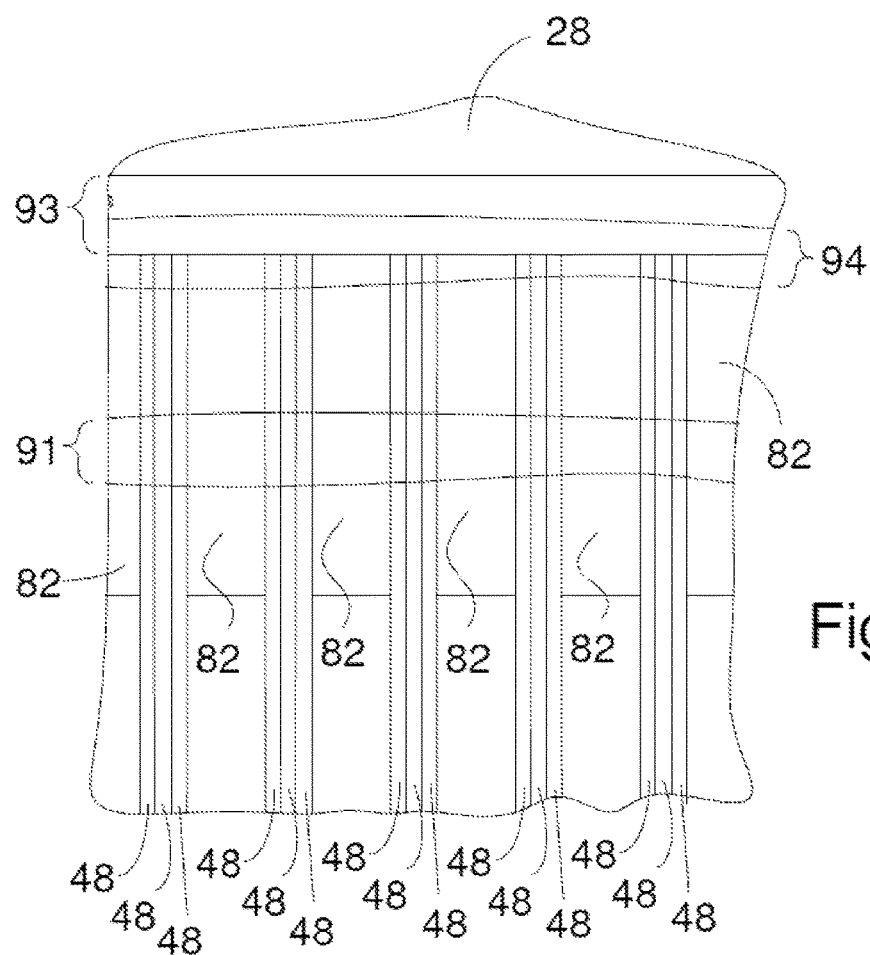

US 10,361,407 B1

INTERFACE BETWEEN ELECTRODES AND BATTERY TERMINAL

FIELD

The present invention relates to electrical energy storage devices, and more particularly to feedthrough structures.

BACKGROUND

A variety of electrical energy storage devices make use of feedthrough pins that act as terminals for the device. One of the challenges presented by feedthrough pins is creating a seal between the case of the device and the feedthrough pin. The integrity of these seals must be able to withstand the pressures generated within these devices. In devices such as batteries, the integrity of these seals must be able to tolerate the corrosive nature of electrolytes within the case. Further, the seal must be simple enough to be practical for device fabrication. As a result, there is a need for a seal that is suitable for use in fabrication of electrical energy storage devices.

SUMMARY

An electrical energy storage device has electrodes positioned in a case. A feedthrough pin extends through a portion of the case. A sealant surrounds the feedthrough pin and contacts a component of the device. A seal activator is received in the sealant such that the pressure that the sealant applies to the component increases above the level of pressure that the sealant applies to the component before the sealant activator is received in the sealant. In some instances, the component is the feedthrough pin.

BRIEF DESCRIPTION OF THE FIGURES

FIG. 1A is an exploded view of a suitable header assembly.

FIG. 1B is a perspective view of the header assembly of FIG. 1A after assembly of the header assembly.

FIG. 1C is a cross section of the header assembly shown in FIG. 1A and FIG. 1B taken along a line extending between the brackets labeled A in FIG. 1B.

FIG. 2A includes a cross section of the sealant taken along the longitudinal axis of the sealant. FIG. 2A also includes a cross section of a seal activator taken along the longitudinal axis of the seal activator.

FIG. 2B is a cross section of the seal activator of FIG. 2A received in the sealant of FIG. 2A.

FIG. 2C shows the seal activator and sealant of FIG. 2B used in conjunction with a cover so as to form a seal between a feedthrough pin and the cover.

FIG. 6A is a side view of the cathode and FIG. 6B is a cross-section of the cathode shown in FIG. 6A taken along a line extending between the brackets labeled B.

FIG. 6C compares a side view of the anode and a sideview of the separator bag.

FIG. 6D is a cross-section of the anode shown in FIG. 6C taken along a line extending between the brackets labeled D.

FIG. 7A through FIG. 7D illustrate assembly of an electrical energy storage device using the header assembly. Electrodes and washers are positioned on a header assembly so as to provide the structure of FIG. 7A through FIG. 7C. FIG. 7A is a side view of a cross section taken through one of the electrodes. FIG. 7B is a side view of a cross section taken through one of the washers. FIG. 7C is a sideview of a portion of the header assembly shown in FIG. 7A and FIG. 7B taken looking in the direction of the arrows labeled A in FIG. 7A and FIG. 7B.

FIG. 7D illustrates the structure of FIG. 7A through FIG. 7C being inserted into the bottom of a case.

DETAILED DESCRIPTION

An electrical energy storage device has electrodes positioned in a case. A feedthrough pin extends through a portion of the case. A sealant surrounds the feedthrough pin and contacts different components of the device. A seal activator is received in the sealant so as to increase the level of pressure that the sealant applies to the components. The seal activator and sealant are constructed such that the amount of pressure that the sealant applies to the components is sufficient to form a seal between the sealant and each of the components. As a result, the pressure can be increased until the sealant seals the space between the components to the passage of liquids such as battery electrolytes. In some instances, the components contacted by the sealant are the feedthrough pin and the case. As a result, the pressure can be increased until the sealant seals the space between the case and the feedthrough pin to the passage of liquids. This sealing mechanism is simple enough for large-scale fabrication of the device and has an integrity that is suitable for withstanding the pressures within these devices. For instance, the seal can have sufficient integrity to withstand pressures within batteries such as lithium-ion batteries.

Figure 1A:
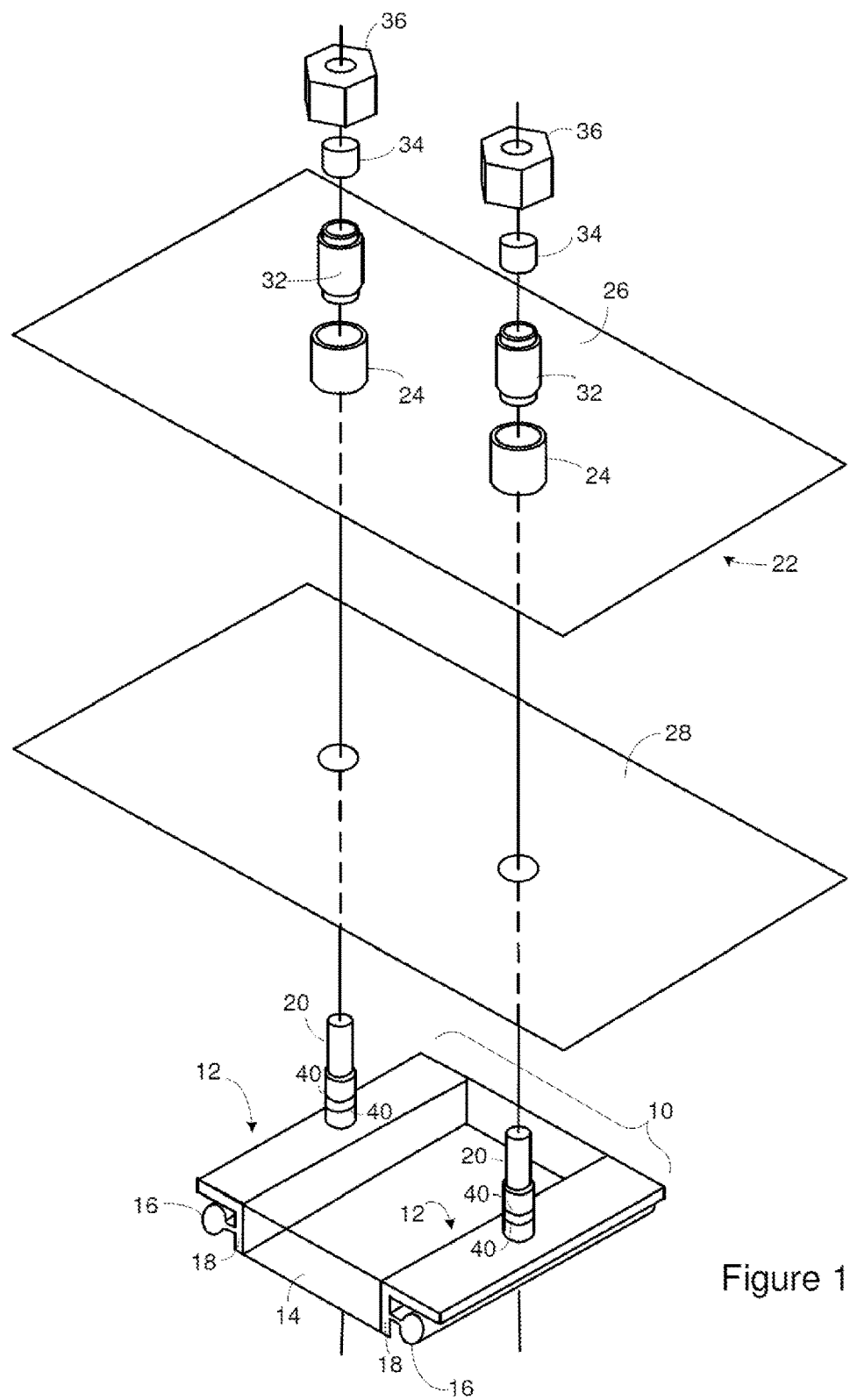
FIG. 1A through FIG. 1C illustrate an electrical energy storage device that makes use of a header assembly that acts as an interface between terminals and electrodes.
Figure 1B:
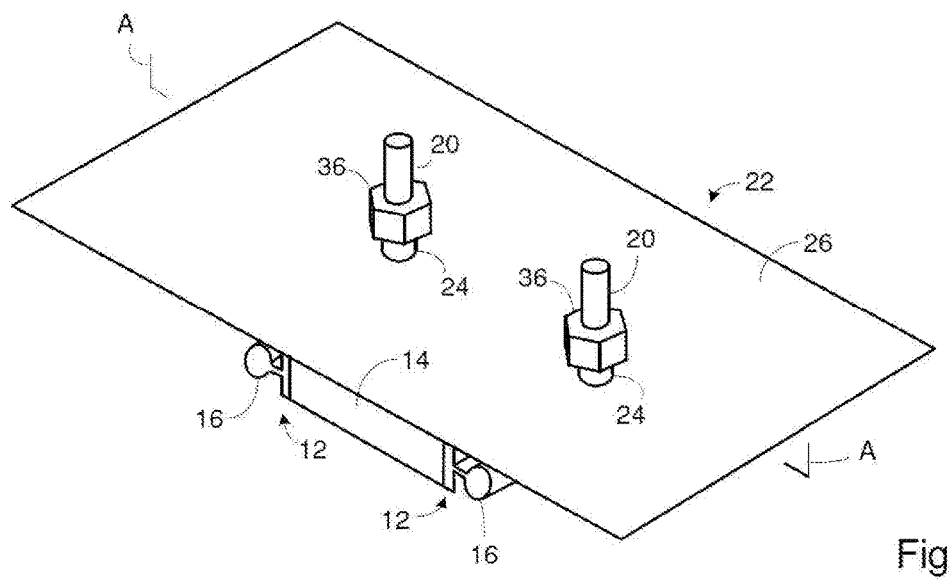
Figure 1C:
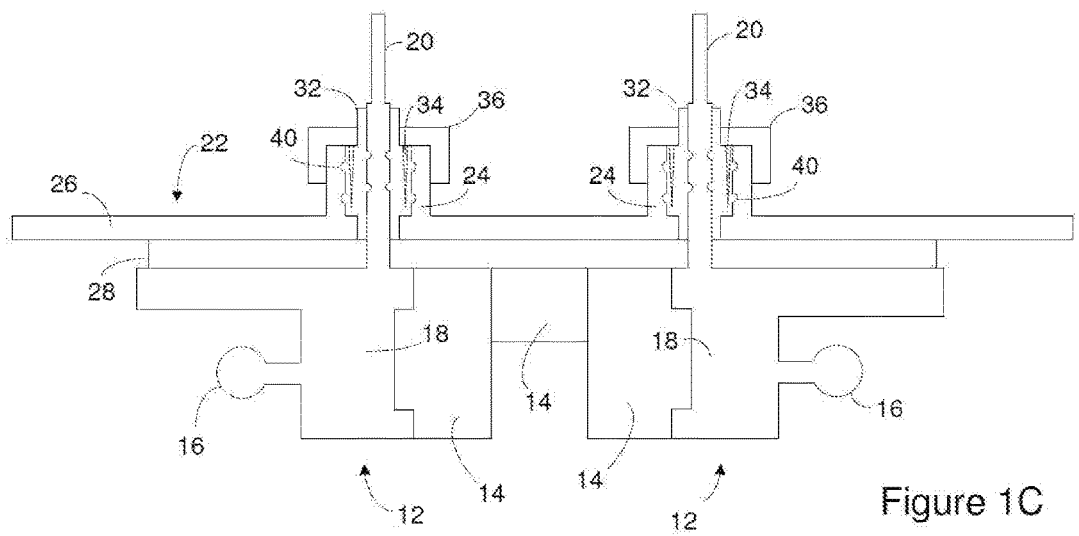

An electrical device can make use of a header assembly that acts as an interface between the terminals and electrodes of an electrical energy storage device. FIG. 1A is an exploded view of a suitable header assembly. FIG. 1B is a perspective view of the header assembly after assembly of the header assembly. FIG. 1C is a cross section of the header assembly shown in FIG. 1A and FIG. 1B taken along a line extending between the brackets labeled A in FIG. 1B. The header assembly includes an interface structure 10 that includes two terminal supports 12. In FIG. 1A, a portion of the interface structure 10 is treated as transparent in order to show the underlying features and/or structures.

One or more insulating members 14 couple the terminal supports 12 such that the terminal supports 12 are electrically isolated from one another. FIG. 1A illustrates the terminal supports 12 coupled by a single insulating member 14 while FIG. 1C illustrates the terminal supports 12 coupled by multiple insulating members 14. The one or more insulating members 14 can reduce or stop movement of the terminal supports 12 relative to one another. Suitable insulating member 14 can be injection molded or machined. Suitable materials for constructing the insulating member 14 include, but are not limited to, perfluoroalkoxy (PFA) or polyphenylene sulfide (PPS).

In some instances, a side of the one or more insulating members 14 includes a projection that is received in a recess on the terminal support 12 as is shown in FIG. 1C. In addition to these recesses and projections or as an alternative to these recesses and projections, a variety of techniques can optionally be employed to mechanically connect the terminal supports 12 to the one or more insulating member 14 and/or to mechanically connect insulating member 14 to one another. For instance, fasteners such as pins, nails, and/or threaded screws can extend though one of the terminal supports 12 and the insulating member 14. Other attachment methods such as adhesives can also be employed.

Each terminal support 12 includes an electrode-receiving member 16 coupled to a member body 18. The electrode-receiving members 16 are each configured to serve as a current collector. Suitable electrode-receiving members 16 include, but are not limited to, posts and rods. Each terminal support 12 also includes a feedthrough pin 20 coupled to the member body 18. The member body 18 can be electrically conducting. As a result, the member body 18 can provide electrical communication between the feedthrough pin 20 and the electrode-receiving member 16. The member body 18, electrode-receiving member 16, and feedthrough pin 20 can all be electrically conducting.

In some instances, the terminal supports 12 have a one-piece construction. For instance, the member body 18, electrode-receiving member 16, and feedthrough pin 20 can all be machined from a single block of material. In these instances, there are not junctions between different parts of a terminal support 12. Likewise, there are not different connection devices and/or connection points such as welds, pins, and/or screws between the different parts of a terminal support 12. When the terminal supports 12 have a one-piece construction, a suitable material for the terminal supports 12 includes, but is not limited to, Stainless Steel, Al, Ti, and Cu. In other instances, the terminal supports 12 have a multi-piece construction. For instance, the feedthrough pin 20 can be constructed of different materials than the member body 18 and/or the electrode-receiving member 16. These different components of the terminal support 12 can be assembled using a variety of methods that can include, but are not limited to, welding, screws, and friction welding. When the terminal supports 12 have a multi-piece construction, suitable materials for the different components of the terminal supports 12 include, but are not limited to, Stainless Steel, Al, Ti, Ni, Cu, and combinations thereof.

The header assembly also includes a cover 22 for use with the interface structure 10. The cover includes sleeves 24 that extend upward from a base 26. The sleeves 24 can be continuous with the base 26 or can be attached to the base 26. As will become evident below, the cover 22 is attached to a case. Suitable materials for the cover 22 include, but are not limited to, Stainless Steel, Al and Ti. The cover 22 can also be clad with material that facilitates assembly of the cell. For instance, if the case is constructed of aluminum, the cover 22 can be stainless steel with an aluminum cladding. The aluminum cladding can be positioned so the aluminum cladding is welded to the case. Since the welding of aluminum to aluminum is more robust than welding of aluminum to different materials, the aluminum cladding improves the cell assembly process and the weld quality.

Upon assembly of the header assembly, the feedthrough pins 20 each extend through a sleeve 24. In some instances, each sleeve surrounds one of the feedthrough pins 20. The portion of a feedthrough pin 20 that is accessible from above the cover 22 serves as a terminal for the device. The header assembly is configured such that the terminals are electrically isolated from one another.

The header assembly also includes an insulating material 28 that fits between the cover 22 and the terminal supports 12. For instance, the insulating material 28 can be positioned between the cover 22 and the electrode-receiving member 16 and between the cover 22 and the member body 18. Upon assembly of the header assembly, the insulating material 28 is positioned to prevent electrically conducting parts of the header assembly from contacting the cell cover 22. In some instances, the insulating material 28 can also be configured to prevent electrically conducting parts of the header assembly from contacting the case. Suitable materials for the insulating material 28 include, but are not limited to, Polyphthalamide (PPA), KAPTON®, KAPTON® polyimide film, and Polyphenylenesulfide (PPS).

The insulating material 28 includes openings that each aligns with one of the feedthrough pins 20 upon assembly of the header assembly. As a result, the feedthrough pins 20 each extend through an opening in the insulating material 28 and through a sleeve 24 in the cover 22.

The header assembly includes a sealant 32 that insulates the feedthrough pin 20 from the cover 22. In some instances, the sealant 32 insulates the sleeve 24 and base 26 from the feedthrough pin 20. For instance, the sealant 32 can be electrically insulating and positioned between the feedthrough pin 20 and the sleeve 24 and also between the feedthrough pin 20 and the base 26. In some instances, each sealant 32 surrounds a feedthrough pin 20 and is between the feedthrough pin 20 and the sleeve 24 and/or between the feedthrough pin 20 and the base 26.

As will become evident below, during assembly of the header assembly the sealant 32 may be pressed downward. As a result, a portion of the cover 22 may be positioned under a portion of the sealant 32 so as to prevent downward movement of the sealant 32. For instance, the thickness of the sealant 32 illustrated in FIG. 1C changes such that the portion of the sealant 32 between the base 26 and the feedthrough pin 20 is thinner than the portion of the sealant 32 between the sleeve 24 and the feedthrough pin 20. As a result, as shown in FIG. 1C, a portion of the sealant 32 can be located above the base 26 when moving in the vertical direction relative to the base 26. In FIG. 1C, the change in thickness is achieved through the result of a stair-step on one side of the sealant 32.

As will be discussed in more detail below, the sealant 32 creates a seal between the feedthrough pin 20 and the cover 22. Accordingly, the sealant 32 can be constructed of traditional feedthrough seal materials. Examples of suitable materials for the sealant 32 include, but are not limited to, Polyphenylenesulfide (PPS), high density polyethylene (HDPE), and Nylon.

As will be discussed in more detail below, the header assembly includes a seal activator 34 that interacts with the sealant 32 so as to activate the seal between the feedthrough pin 20 and the cover 22. For instance, the seal activator 34 can cause the sealant 32 to seal the space between the feedthrough pin 20 and the cover 22. In some instances, the seal activator 34 surrounds the feedthrough pin 20.

The header assembly includes connectors 36 that are each attached to another component of the header assembly such that a feedthrough pin 20 extends through each connector 36. For instance, FIG. 1A through FIG. 1C show each connector 36 connected to one of the sleeves 24 with a feedthrough pin 20 extending through a hole through the connector 36. Each connector 36 is also configured to immobilize the sealant 32 and a seal activator 34 within one of the sleeves 24. For instance, FIG. 1A through FIG. 1C show each connector 36 connected to one of the sleeves 24 such that a sealant 32 and a seal activator 34 are positioned within a sleeve such that the seal activator 34 is between the connector 36 and the cover and such that at least a portion of the sealant 32 is between the connector and the base 26. Since at least a portion of the sealant 32 can be located between the connector and the base 26 of the cover, a connector 36 can compress a sealant 32 and/or seal activator 34 located between that connector 36 and that cover. In some instances, the compression is such that one of the seal activators 34 is pressed into the sealant 32.

In one example, the connector 36 is threaded onto a sleeve. For instance, an exterior of each sleeve can include threads (not illustrated) and an interior of each connector 36 can have complementary threads (not illustrated). As a result, the connector 36 can be threaded onto the sleeve 24 in a fashion similar to the way a nut is threaded onto a bolt. Further, threading the connector 36 onto the sleeve 24 can push the sealant 32 and/or seal activator 34 downward toward the cover. As a result, the connector 36 can be threaded onto the sleeve 24 until the desired level of compression of the sealant 32 and/or seal activator 34 within a sleeve 24 is achieved.

In some instances, the connectors 36 are constructed of an electrically conducting material. As a result, the sealant 32 can be configured to insulate the connector 36 from the feedthrough pin 20. For instance, the sealant 32 can be electrically insulating and positioned between a feedthrough pin 20 and connector 36 as shown in FIG. 1A through FIG. 1C. In some instances, the sealant 32 surrounds the feedthrough pin 20 and is between the feedthrough pin 20 and the connector 36.

As discussed above, a connector 36 may compress and/or immobilize the sealant 32 and/or seal activator 34 against the cover. As a result, a portion of the connector 36 may be positioned over a portion of the sealant 32 so as to limit the upward movement of the sealant 32. For instance, the thickness of the sealant 32 can change such that the portion of the sealant 32 between the connector 36 and the feedthrough pin 20 is thinner than the portion of the sealant 32 between the sleeve 24 and the feedthrough pin 20. As a result, as shown in FIG. 1C, a portion of the sealant 32 can be located under the connector 36 when moving in the vertical direction relative to the connector 36. In FIG. 1C, the change in thickness is achieved through the result of a stair-step on one side of the sealant 32. Suitable materials for the connector include, but are not limited to, Stainless Steel or Ti.

Figure 2A:
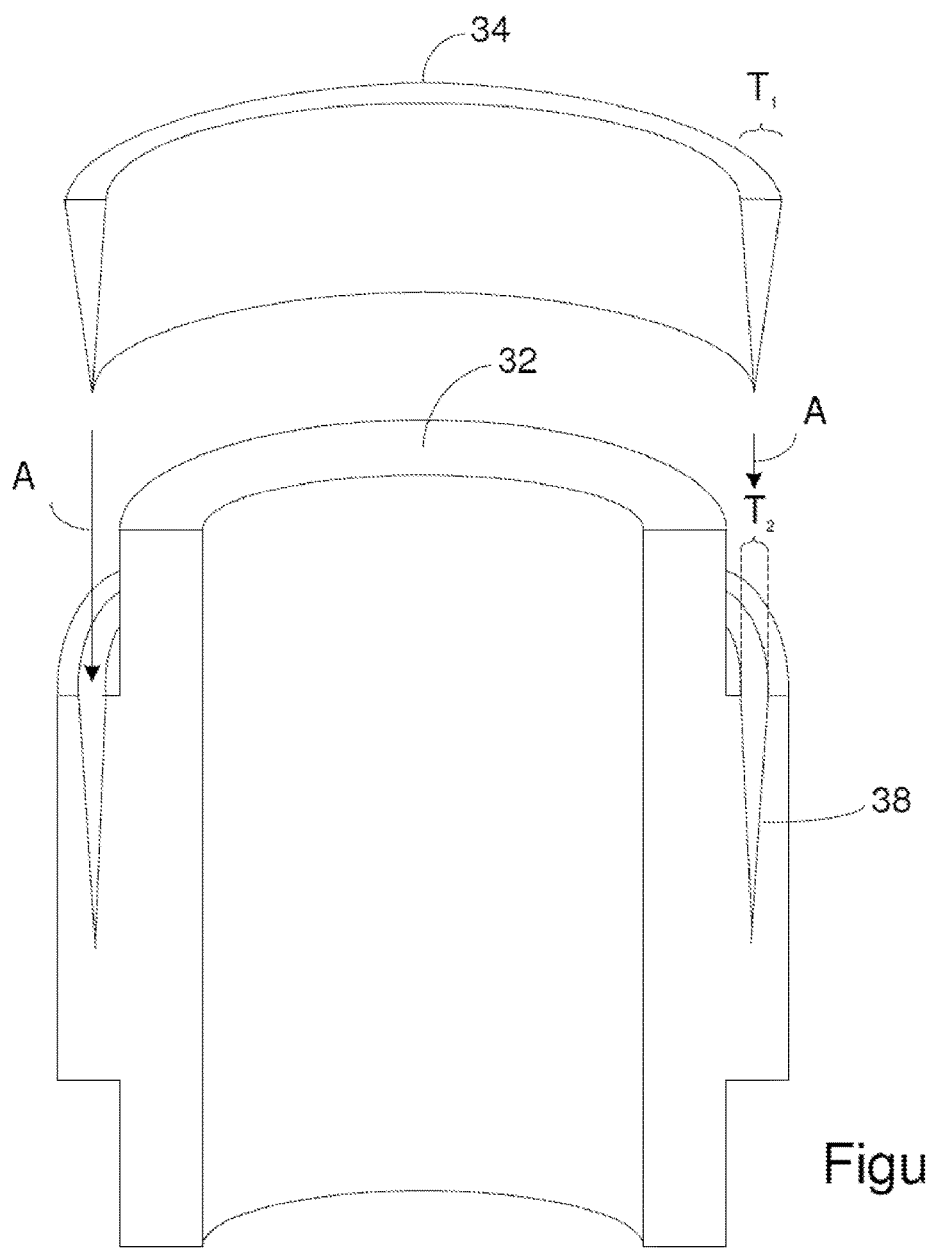
FIG. 2A through FIG. 2C illustrate how a sealant and a seal activator interact so as to form a seal between a feedthrough pin and a cover of the device.
Figure 2B:
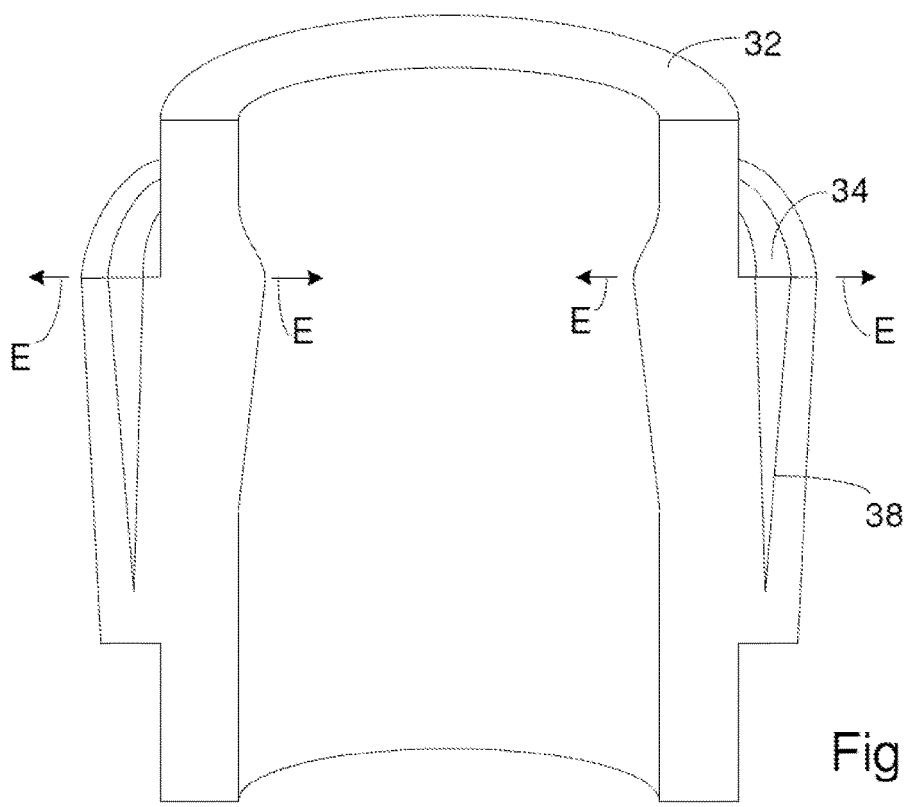

FIG. 2A and FIG. 2B illustrate how the sealant 32 and the seal activator 34 interact so as to form a seal between the feedthrough pin 20 and sleeve 24. FIG. 2A includes a cross section of a sealant 32 taken along the longitudinal axis of the sealant 32. FIG. 2A also includes a cross section of a seal activator 34 taken along the longitudinal axis of the seal activator 34. The sealant 32 includes a recess 38 that receives the seal activator 34 as illustrated by the arrows labeled A in FIG. 2A.

FIG. 2B is a cross section of the result that is achieved when the seal activator 34 from FIG. 2A is positioned in the recess 38 of FIG. 2A. The seal activator 34 is configured to expand the width of the sealant 32 when the seal activator 34 is positioned in the recess 38 beyond the width that the sealant 32 would have if the seal activator 34 were not positioned in the recess. For instance, the thickness of the seal activator 34 can increase when moving toward the top of the seal activator. As an example, the seal activator 34 of FIG. 2B has a wedge shaped cross-section and the recess 38 of FIG. 2B also has a wedge shaped cross-section. The thickest part of the seal activator 34 is labeled $T_1$ in FIG. 2A. Similarly, the widest part of the recess 38 is labeled $T_2$ in FIG. 2A. The seal activator 34 can be constructed such that $T_1$ exceeds $T_2$. Since the thickest part of the seal activator 34 is located at the widest part of the recess 38 when the seal activator 34 is positioned in the recess 38 as shown in FIG. 2B, $T_1$ exceeding $T_2$ expands the width of the sealant 32 as illustrated by the arrows labeled E in FIG. 2B.

Figure 2C:
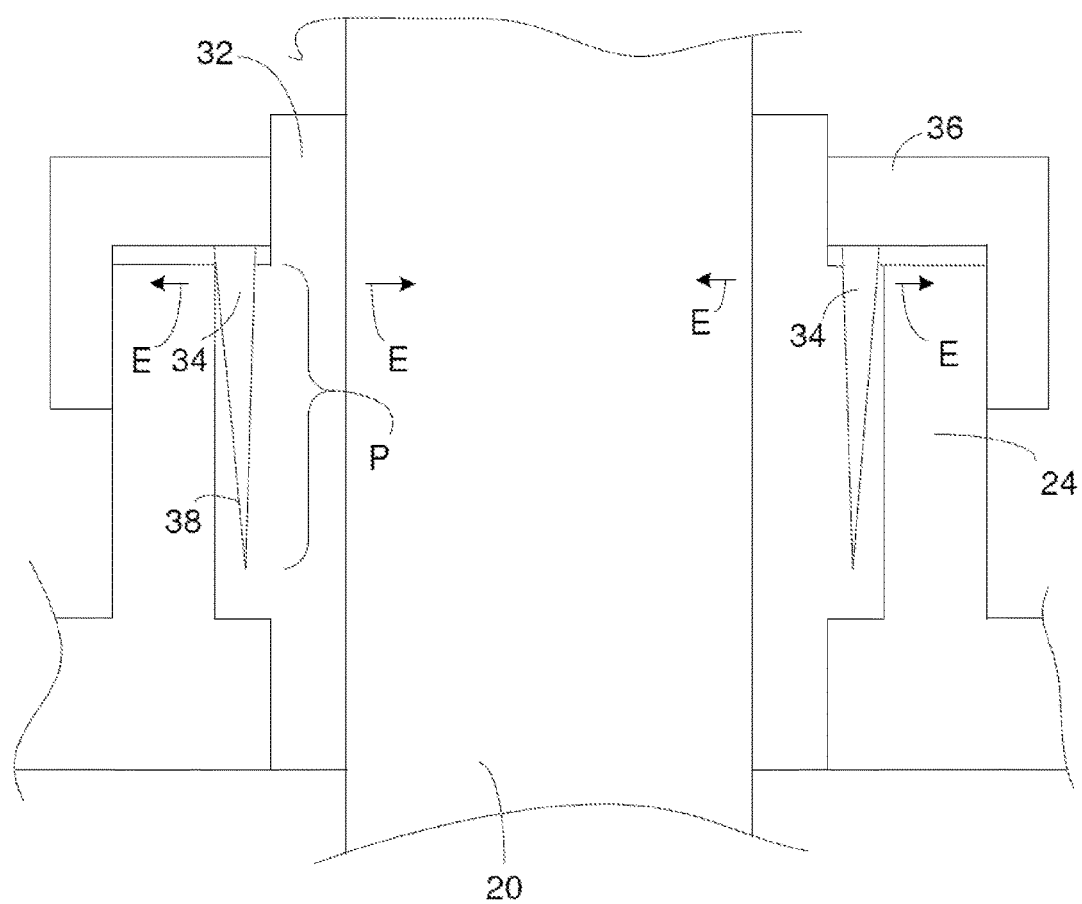

Although FIG. 2B illustrates outward movement of the sealant 32, the actual outward movement of the outer surface and the inner surface sealant 32 is limited or eliminated by the presence of the sleeve 24 and feedthrough pin 20. For instance, FIG. 2C shows the seal activator 34 and sealant 32 of FIG. 2B in conjunction with a sleeve 24 and feedthrough pin 20. The forces that cause the movement of the inner and outer surface of the sealant 32 in FIG. 2B are labeled E in FIG. 2C. The presence of the sleeve 24 and feedthrough pin 20 limits the actual movement of the sealant 32. However, the opposing surfaces of the recess 38 can be moved by the insertion of the seal activator 34. As a result, the sealant 32 is pressed against the sleeve 24 and feedthrough pin 20. The feedthrough pin 20 and sealant 32 can be configured such that the force of the sealant 32 being pressed against the sleeve 24 and feedthrough pin 20 is sufficient to form a hermetic seal between the sleeve 24 and feedthrough pin 20. In some instances, the pressing of the sealant 32 against the sleeve 24 and feedthrough pin 20 causes deformation of the sealant 32. For instance, the pressing of the sealant 32 against the sleeve 24 and feedthrough pin 20 can cause compression of the sealant 32. The level of pressure that the sealant 32 applies to the sleeve 24 and/or feedthrough pin 20 can be adjusted by changing the shape and/or dimensions of one or more features selected from the group consisting of the sealant 32, and seal activator 34. For instance, increasing the thickness of the seal activator 34 and/or reducing the width of the recess 38 can increase the pressure that the sealant 32 applies to the sleeve 24 and/or feedthrough pin 20. In some instances, the level of pressure can additionally or alternately be tuned by adjusting the position of connector 36 in relation to the sealant 32. As an example, when the connector 36 is threaded onto a sleeve 24, threading the connector 36 further onto the sleeve 24 can drive the seal activator 34 further into the recess 38 and can accordingly increase the pressure that the sealant 32 applies to the sleeve 24 and/or feedthrough pin 20. In general, increasing the pressure that the sealant 32 applies to the sleeve 24 and/or feedthrough pin 20 increases the integrity of the seal.

Figure 2D:
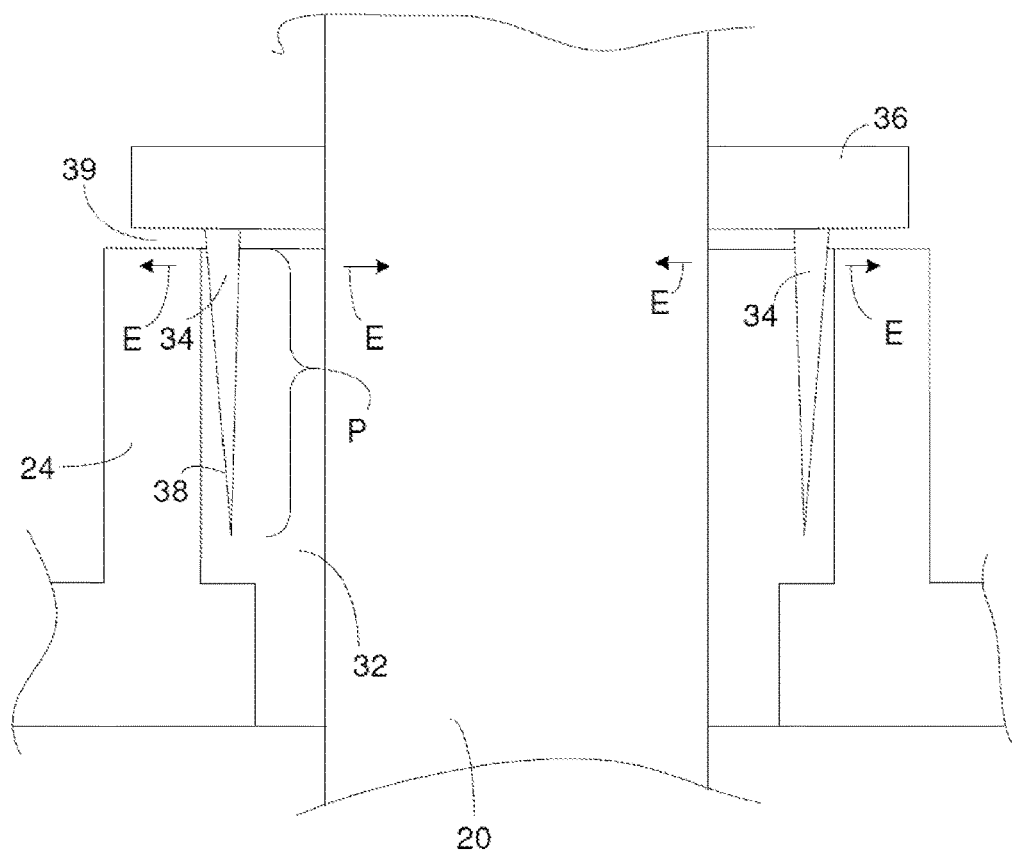
FIG. 2D is a cross section of another embodiment of the header assembly.

FIG. 2C illustrates the connector 36 connected to the sleeves 24, however, the connector can be connected to other components of the header assembly. For instance, the connector 36 can be connected to the feedthrough pin 20. As an example, FIG. 2D is a cross section of a header assembly where the connector 36 can be connected to the feedthrough pin 20. An exterior of the feedthrough pin 20 can include threads (not illustrated) and an interior of each connector 36 can have complementary threads (not illustrated). As a result, the connector 36 can be threaded onto the feedthrough pin 20 in a fashion similar to the way a nut is threaded onto a bolt. Further, threading the connector 36 onto the feedthrough pin 20 can push the sealant 32 and/or seal activator 34 downward toward the cover. As a result, the connector 36 can be threaded onto the sleeve 24 until the desired level of compression of the sealant 32 and/or seal activator 34 within a sleeve 24 is achieved. The connector 36 is constructed such that a portion of the seal activator 34 is located between the connector 36 and the sealant 32. As a result, a gap 39 is formed between the sleeve 24 and the connector 36. When an electrical insulator such as air is in the gap 39, the connector 36 is electrically insulated from the sleeve 24 and accordingly from the cover 22. The connector 36 can be constructed such that the connector 36 does not contact the sealant 32 as shown in FIG. 2D or the connector 36 can be constructed such that the connector 36 contacts the sealant 32 inside of the gap 39.

The distance that the seal activator penetrates the sealant is labeled P in FIG. 2C and FIG. 2D. In some instances, the penetration distance, P, is greater than 5 mm, or 0.1 mm and/or less than 10 mm, or 100 mm. As is evident from a comparison of FIG. 2A and FIG. 2B, in some instances, before the seal activator 34 is received in recess 38, the recess 38 penetrates the sealant 32 by a distance that is less than the distance that the seal activator 34 penetrates the sealant 32. Alternately, before the seal activator 34 is received in recess 38, the recess 38 can penetrate the sealant 32 by a distance that is greater than the distance that the seal activator 34 penetrates the sealant 32. Alternately, before the seal activator 34 is received in recess 38, the recess 38 can penetrate the sealant 32 by a distance that is equal or substantially equal to the distance that the seal activator 34 penetrates the sealant 32.

As is evident from a comparison of FIG. 2B and FIG. 2C, the seal activator 34 can be driven into the sealant 32 until the top of the seal activator 34 is flush with the sealant 32 or without the top of the seal activator 34 becoming flush with the sealant 32. In either case, the thickness of the seal activator 34 at the top of the recess 38 can be greater than or equal to 100.1%, 101%, 102%, or 110% of the width of the recess 38 at the top of the recess before the recess 38 receives the seal activator 34.

Although FIG. 1A through FIG. 2D illustrate the seal activators 34 being separate components from the connectors 36, the seal activators 34 can be integral with the connectors 36.

Although FIG. 2A through FIG. 2D illustrate the sealant 32 including the recess 38 before assembly of the header assembly, the sealant 32 need not include the recess before assembly of the header assembly. In these instances, the seal activator 34 can be driven into the sealant 32 during the assembly of the header assembly. As an example, when the connector 36 is threaded onto a sleeve 24, the threading of the connector 36 onto the sleeve 24 can drive the seal activator 34 into the sealant 32.

Although FIG. 1A through FIG. 2D illustrate a wedge shaped seal activator 34, seal activators 34 with other shapes can be used to generate the pressure levels needed to achieve the desired seal. For instance, the sealant 32 can receive a seal activator 34 shaped as a bullet or a rectangular shape. The sealant activator could also be in the form of a chemical composition that expands upon activation to result in increased pressure within the recess of the sealant 32. Suitable chemical compositions include, but are not limited to, two-part epoxies, and activated polyurethane foam.

Although FIG. 2C and FIG. 2D illustrates the pathway between the sealant 32 and feedthrough pin 20 as straight and smooth; a variety of structures can be employed to increase the tortuosity of the pathway between the sealant 32 and feedthrough pin 20. For instance, the portion of the sealant 32 and/or feedthrough pin 20 along the pathway can include bumps, recesses, ridges, or other structures in any combination and/or quantity. Increasing the tortuosity of this pathway can increase the integrity of the seal between the sealant 32 and feedthrough pin 20.

Figure 3:
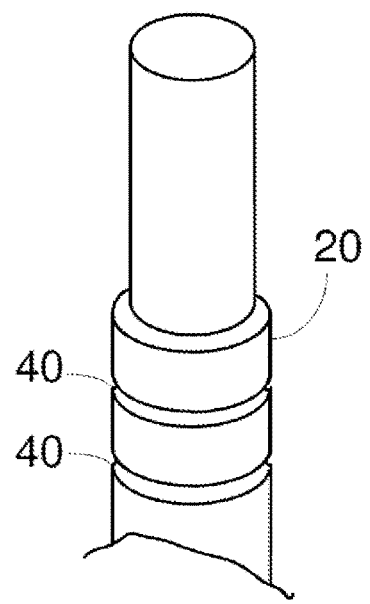
FIG. 3 is a perspective view of a portion of a feedthrough pin that includes structures that increase the tortuosity of the pathway between a sealant and a feedthrough pin.

FIG. 3 is a perspective view of a portion of a feedthrough pin 20 that includes structures that increase the tortuosity of the pathway between the sealant 32 and feedthrough pin 20. The exterior surface of the feedthrough pin 20 includes recesses or channels 40 that extend into the feedthrough pin 20. In some instances, the channels 40 surround the longitudinal axis of the feedthrough pin 20 or extend part way around the perimeter of the longitudinal axis. The channels can be positioned such that they are located in the interface between the sealant 32 and feedthrough pin 20 after assembly of the header assembly. For instance, FIG. 1C shows the pathway between the sealant 32 and feedthrough pin 20 when using a feedthrough pin 20 having channels 40 according to FIG. 3. In FIG. 1C, the sealant 32 extends into the channels 40 and fills up the channels 40, however, the sealant 32 and/or channels 40 can be constructed so that the sealant 32 extends part way into the channels 40 or does not extend into the channels 40.

FIG. 2C illustrate a smooth pathway between the sealant 32 and cover 22; however, a variety of structures can be employed to increase the tortuosity of the pathway between the sealant 32 and cover 22. For instance, the portion of the sealant 32 and/or cover 22 along the pathway can include bumps, recesses, ridges, or other structures. Increasing the tortuosity of this pathway can increase the integrity of the seal between the sealant 32 and cover 22.

Figure 4:
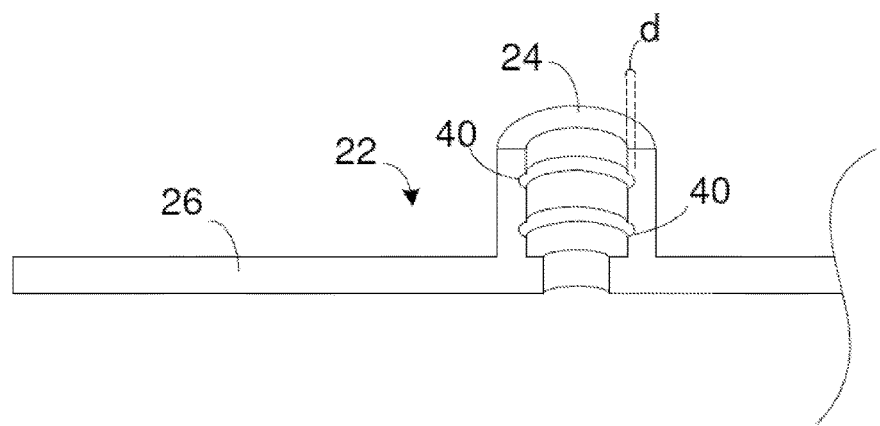
FIG. 4 is a perspective view of a portion of a cover that includes structures that increase the tortuosity of the pathway between a sealant and a cover.

FIG. 4 is a perspective view of a portion of a cover 22 that includes structures that increase the tortuosity of the pathway between the sealant 32 and cover 22 above the level of tortuosity that the pathway would have without the structures. The interior surface of the sleeve 24 includes recesses or channels 40 that extend into the sleeve 24. In some instances, the channels 40 are configured such that each channel surrounds the longitudinal axis of the sleeve. For instance, the channels 40 can be configured such that each channel 40 surrounds the feedthrough pin 20 upon assembly of the header assembly. Alternately, the channels 40 can extend part way around the longitudinal axis of the sleeve 24. The channels can be positioned such that they are located in the interface between the sealant 32 and sleeve 24 after assembly of the header assembly. For instance, FIG. 1C shows the pathway between the sealant 32 and cover when using a cover having channels 40 according to FIG. 4. In FIG. 1C, the sealant 32 extends into the channels 40 and fills up the channels 40, however, the sealant 32 and/or channels 40 can be constructed such that sealant 32 extends part way into the channels 40 or does not extend into the channels 40.

As noted above, a variety of structures can be used to increase pathway tortuosity. Suitable structures for increasing tortuosity, include, but are not limited to, structures having a height above a surface or a depth (labeled d in FIG. 4) into a surface of more than 0.002 inches, 0.005 inches, or 0.010 inches and/or less than 0.002 inches, 0.005 inches, or 0.010 inches. When the structures have an oblong or elongated shape, the structures can be arranged such that the length has an annular position rather than in a longitudinal position in order to increase the effectiveness of the increase in pathway tortuosity.

Figure 5A:
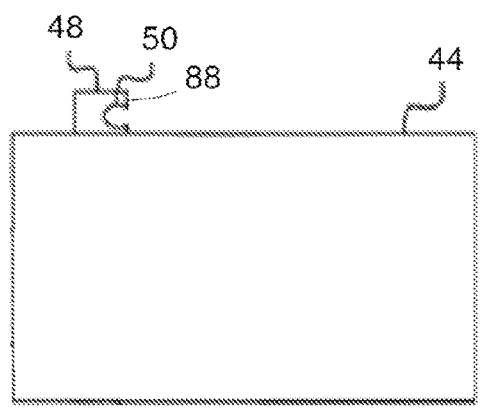
FIG. 5A is a sideview of an electrode system that includes an electrode positioned in a separator bag.
Figure 5B:
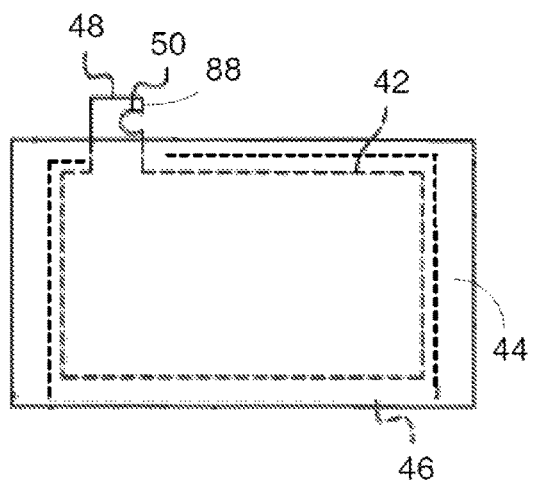
FIG. 5B is the sideview of FIG. 5A with dashed lines showing the location of components within the bag that are not evident from outside of the separator bag. The dashed lines illustrate the location of an electrode and seams within the separator bag. The dashed lines also illustrate the location of a pocket defined by the seams.

FIG. 5A and FIG. 5B illustrate an electrode system that is suitable for use with the header assembly. FIG. 5A is a sideview of an electrode system that includes an electrode positioned within a separator bag. FIG. 5B is the sideview of FIG. 5A with dashed lines showing the location of components within the separator bag that are not evident from outside of the separator bag.

The electrode system includes an electrode 42 positioned between different sides of a separator bag 44. The separator bag 44 includes. The separator bag 44 includes seams 46 that each immobilizes different portions of the separator bag 44 relative to one another. A fold in the separator material serves as a lower seam 46. One or more the seams 46 can optionally include spacers positioned between the different portions of the separator bag 44 as described in U.S. patent application Ser. No. 10/697,537, filed on Oct. 23, 2009, entitled "Separator Bag for Use in Electrochemical Cell," now U.S. Pat. No. 7,951,480, and incorporated herein in its entirety. The seams 46 are arranged so as to define the perimeter of a pocket configured to receive the electrode 42. The pocket is defined such that movement of the electrode 42 within the pocket is at least partially constrained. The electrode 42 is received in the pocket with the edges of the electrode 42 adjacent to the seams.

The electrode 42 includes a tab 48 that extends from the separator bag 44. Although the electrode 42 is shown with a single tab 48, the electrode 42 can include a plurality of tabs 48. Although the tab 48 is shown extending from an upper edge of the separator bag 44, the electrode 42 can include one or more tabs 48 extending from a lateral edge of the separator bag 44 and/or from a lower edge of the separator bag 44.

The tab 48 includes a tab opening 50. The tab opening 50 is open to an edge of the tab 48. Alternatively, the tab opening 50 can be positioned on the tab 48 such that the tab 48 surrounds the opening.

An electrical energy storage device can be constructed by stacking electrodes on top of one another. The stack is generally formed by alternating electrodes that are positioned in a separator bag with electrodes that are not positioned in a separator bag. In some instances, the electrodes within the separator bag are cathodes and the electrodes that are not positioned within a separator bag are anodes.

Figure 6A:
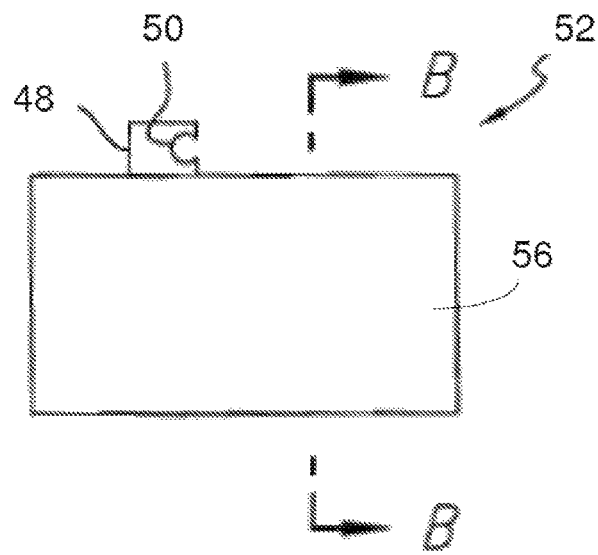
FIG. 6A and FIG. 6B illustrate one example of a suitable cathode for use with the electrode system.
Figure 6B:
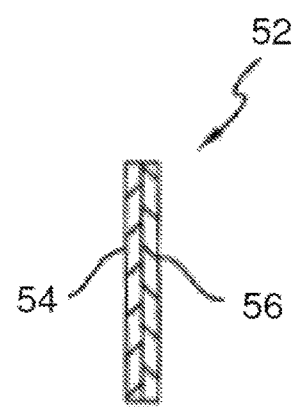

FIG. 6A and FIG. 6B illustrate one example of a suitable cathode 52 for use with the electrode system. FIG. 6A is a side view of the cathode 52 and FIG. 6B is a cross-section of the cathode 52 shown in FIG. 6A taken along a line extending between the brackets labeled B. The cathode 52 includes a substrate 54, a positive active medium 56 and one or more tabs 48. Although the positive active medium is shown on one side of the substrate, the positive active medium can be positioned on both sides of the substrate. The tab 48 and the substrate 54 can be constructed of a continuous material. Alternately, the tab 48 and the substrate 54 can be different materials. Suitable substrates 54 include, but are not limited to, mesh, porous or solid substrates. Suitable substrate materials include, but are not limited to aluminum, copper and/or titanium. The positive active medium 56 can be formed on the substrate 54 using a variety of techniques including laminating, calendaring, vapor deposition, etc. A positive active medium 56 includes one or more positive active materials. The positive active medium 56 can also optionally includes a binder and/or a conductivity enhancer. The positive active medium 56 can include one or more other components.

Figure 6C:
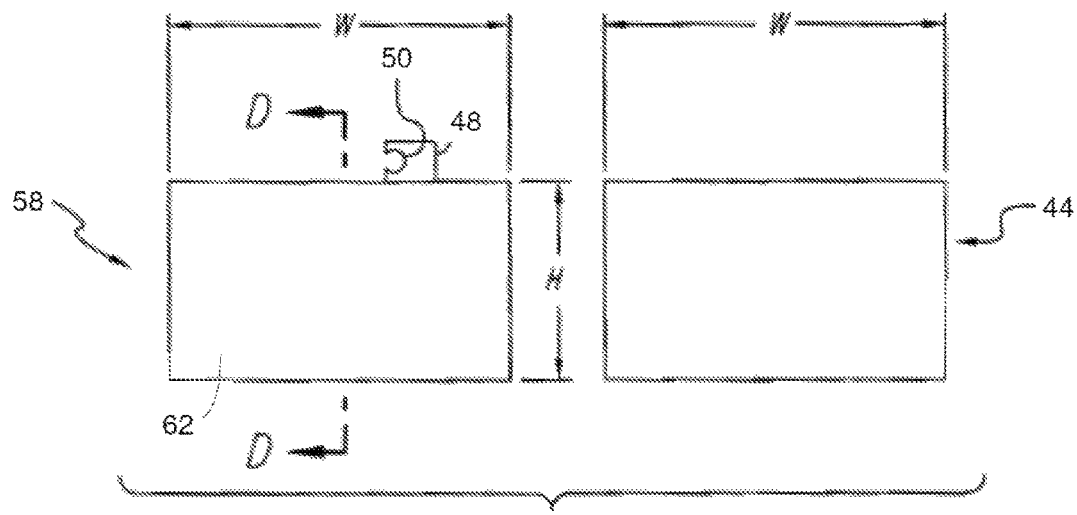
FIG. 6C and FIG. 6D illustrate an anode 58 for use with the electrode system of FIG. 6A and FIG. 6B.
Figure 6D:
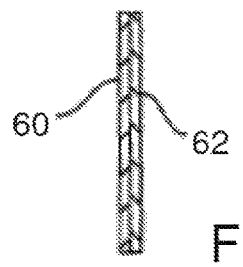

FIG. 6C and FIG. 6D illustrate one example of a suitable anode 58 for use with the electrode system. FIG. 6C compares a side view of the anode 58 and a sideview of the separator bag 44. FIG. 6D is a cross-section of the anode 58 shown in FIG. 6C taken along a line extending between the brackets labeled D. The anode 58 includes a substrate 60, a negative active medium 62 and a tab 48. Although the negative active medium is shown on one side of the substrate, the negative active medium can be positioned on both sides of the substrate. The tab 48 includes a tab opening 50. As is evident in FIG. 6C, the tab opening 50 is open to an edge of the tab 48. Alternatively, the tab opening 50 can be positioned on the tab 48 such that the tab 48 surrounds the opening 40.

The tab 48 on the anode 58 is positioned in a different location than the tab 48 on the cathode 52. As a result, the tab 48 of the anode 58 is not aligned with the tab 48 of the cathode 52 when the electrodes 42 are stacked on top of one another. The tab 48 and the substrate 60 can be constructed of a continuous material. Alternately, the tab 48 and the substrate 60 can be different materials. Suitable substrates 60 include, but are not limited to, mesh, porous or solid substrates. Suitable substrate materials include, but are not limited to aluminum, copper and/or titanium. The negative active medium 62 can be formed on the substrate 60 using a variety of techniques including laminating, calendaring, vapor deposition, etc. A negative active medium 62 includes one or more negative active materials. The negative active medium 62 can also optionally includes a binder and/or a conductivity enhancer. The negative active medium 62 can include on or more other components.

FIG. 6C includes also shows a first side of a separator bag 44. The first side of the separator bag 44 has about the same width, W, and length, height, H, as the flat side of the anode 58. The tab 48 is not included in the height of the anode 58. When the electrode stack is formed during fabrication of the electrical energy storage device, the flat side of the anode 58 is positioned on the first side of the separator bag 44. Because the separator bag 44 and the anode 58 have about the same width and height, the perimeter of the anode 58 and the perimeter of the separator bag 44 can be aligned with one another. As a result, the separator bag 44 and anode 58 construction can help align the anode 58 with the separator bag 44.

Although the anode 58 is illustrated as having the same size as the separator bag 44, the anode 58 and the cathode 52 can have different dimensions. Additionally, in some instances, an electrical energy storage device is constructed with the anodes 58 positioned in separator bag 44 and cathode(s) 52 not positioned in separator bag 44.

Although the anode 58 and the cathode 52 are illustrated with a width that exceeds the height, the anode 58 and cathode 52 can be constructed with a width less than the height. Additionally, the separator bag 44 can be constructed with the width that is less than the height.

The separator bag can be constructed of a separator material. Suitable separator materials allow ions to pass through the separator. Examples of suitable separator materials include, but are not limited to, polyethylene, polypropylene and mixtures thereof. In some instances, the separator material includes multiple layers of material.

Figure 7A:
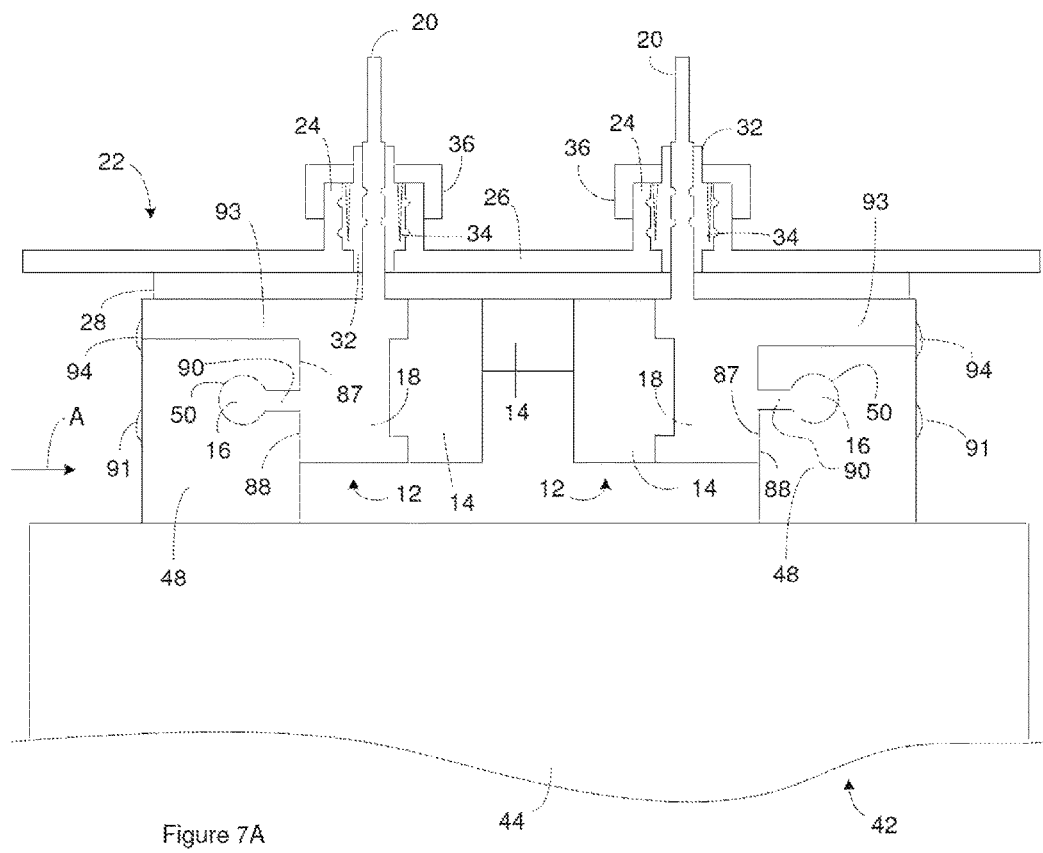
Figure 7B:
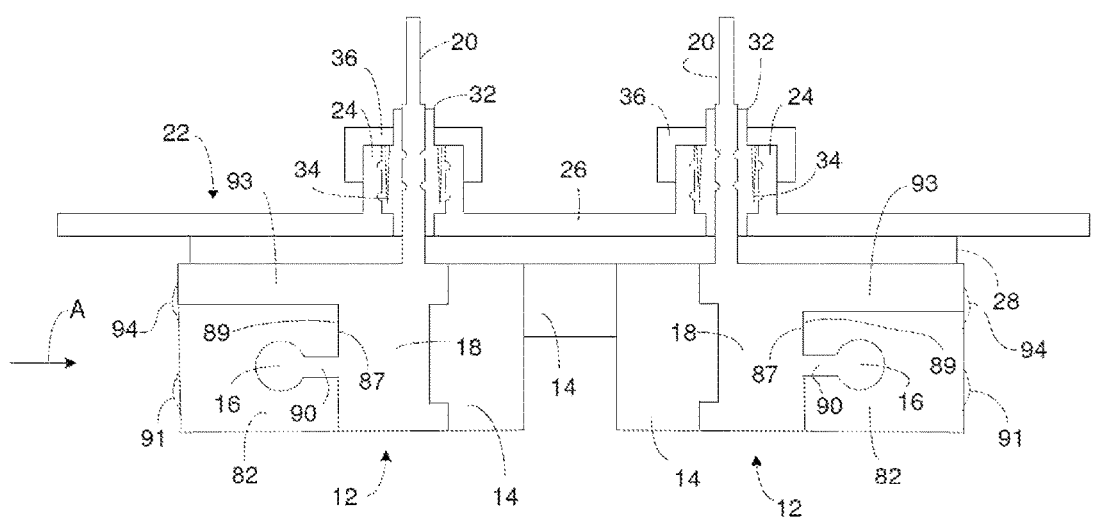

FIG. 7A through FIG. 7D illustrate assembly of an electrical energy storage device using the header assembly. The electrode-receiving members 16 are sized such that the tab opening 50 of an electrode 42 can be positioned over the electrode-receiving member 16 and slid along the electrode-receiving member 16. For instance, FIG. 7A is a cross section of an header assembly with the tab 48 of an electrode slid along each of the electrode-receiving members 16 shown in the header assembly of FIG. 1C. In some instances, washers can also be positioned over the electrode-receiving member 16 and slid along the electrode-receiving member 16. For instance, FIG. 7B illustrates the header assembly of FIG. 7A with a washer 82 slid along each of the electrode-receiving members 16. The washer 82 can be constructed of an electrically conducting material. Suitable materials for the washers 82 include, but are not limited to, Stainless Steel, Al and Ti.

The tab openings and/or the openings in the washer can be configured such that they extend around more than half of the perimeter of the electrode-receiving member in order to constrain them on the electrode-receiving member. For instance, if the electrode-receiving member has a circular cross section, the tab opening being around more than 180° of the circular cross section can prevent the tab or washer from being pulled laterally off of the electrode-receiving member.

The electrode-receiving members 16 are attached to an interface side 87 of the member body 18. The interface side 87 of the member body 18 can be positioned adjacent to an interface side 88 of a tab 48 positioned on the electrode-receiving member 16 as shown in FIG. 7A and/or an interface side 89 of a washer 82 positioned on the electrode-receiving member 16 as shown in FIG. 7B. The interface side 88 of the tab 48 and/or the interface side 89 of the washer 82 can be constructed so as to have a shape that is complementary to at least a portion of the interface side 87 of the member body 18. As a result, the interface side 88 of a tab 48 slid along the electrode-receiving member 16 can sit flush against the interface side 87 of the member body 18. Additionally, the interface side 89 of a washer 82 slid along the electrode-receiving member 16 can sit flush against the interface side 87 of the member body 18. The flush positioning of the interface sides can reduce rotation of an electrode and/or a washer 82 around the electrode-receiving member 16. This reduced rotation can aid in the alignment of the electrodes that are positioned on an electrode-receiving member 16. Additionally or alternatively, the reduced rotation can aid in the alignment of the washers 82 positioned on an electrode-receiving member 16. Alignment of the washers 82 can facilitate welding of the washers 82 to one another.

In some instances, a stem 90 connects the electrode-receiving member 16 to the interface side 87 of the member body 18. As evident in FIG. 7A, the tab opening 50 can have a shape that is complementary to the shape of the stem 90 and the electrode-receiving member 16. As a result, the stem 90 can prevent rotation of the electrode around the electrode-receiving member 16 and can aid in the alignment of the electrodes positioned on the electrode-receiving member 16.

The tabs 48 of a plurality of electrodes can be slid along each of the electrode-receiving members 16 as shown in FIG. 7C. FIG. 7C is a sideview of a portion of the header assembly shown in FIG. 7A and FIG. 7B taken looking in the direction of the arrows labeled A in FIG. 7A and FIG. 7B. The tabs 48 from a plurality of electrodes and washers 82 are slid along an electrode-receiving member (not visible) such that a plurality of tabs 48 are positioned between adjacent pairs of washers 82. A weld 91 bonds the washers 82 together. In FIG. 7C, the weld 94 is treated as transparent so the arrangement of underlying features is visible. The weld 91 can ensure the electrical communication between each of the electrodes and the electrode-receiving member 16 and/or immobilize the tabs 48 relative to one another. A suitable technique for welding of the washers 82 and tabs 48 includes, but is not limited to, laser welding.

The terminal support 12 also includes an overhang 93 extending outward from the member body 18. The insulating material 28 is between the cover 22 and the overhang 93. The overhang 93 is positioned between an upper edge of the tabs 48 and the cover 22 and/or between an upper edge of the washers 82 and the cover 22. The upper edge of a tab is the edge of the tab closest to the cover and the upper edge of washers is the edge of the washer closest to the cover. Further, in some instances, the overhang 93 is substantially parallel or is parallel to the tops of the tabs 48. As is evident from each of FIG. 7A through FIG. 7C, a line that is perpendicular to an upper edge of the tabs and extends through the upper edge of the tabs can also extend through the overhang. Similarly, a line that is perpendicular to an upper edge of the washers and extending through the upper edge of the washer can also extend through the overhang. Additionally or alternately, a line that is perpendicular to the overhang and extends through the overhang can also extend through an upper edge of a tab or washer.

The overhang 93 can extend outward from the member body 18 toward the edge of the tabs 48 and comes close enough to the edge of the tabs 48 that the tabs and/or washers 82 can be welded directly to the overhang 93. For instance, a weld 94 can contact both a washer(s) 82 and the overhang 93 and/or a tab(s) 32 and the overhang 93. In FIG. 7C, the weld 94 is treated as transparent so the arrangement of underlying features is visible. The weld 94 can immobilize the tabs 48 and/or washers 82 relative to the electrode-receiving members 16 and/or ensure electrical communication between the tabs 48 and the terminal support 12. In some instances, the overhang 93 extends outward from the member body 18 toward the edge of the tabs 48 such that a side of the overhang 93 is substantially flush with the edge of the tabs 48 or extends beyond the edge of the tabs 48. In some instances, the overhang 93 extends outward from the member body 18 and past the edge of the tabs 48. In these instances, the weld 91 between the electrodes and the tabs 48 can contact the bottom side of the overhang 93. A suitable technique for welding of the washers 82, tabs 48, and/or overhang 93 includes, but is not limited to, laser welding.

As is evident from FIG. 7A through FIG. 7C, the tabs and/or washers can contact the terminal support at one or more locations. For instance, the tabs and/or washers can contact the terminal support at one, two, three, or four locations on the terminal support where the locations are selected from a group consisting of the electrode-receiving member, the stem, the interface side, and the overhang. In some instances, the tabs and/or washers contact at least the overhang and/or at least the interface side. In some instances, the tabs and/or washers contact at least the electrode-receiving member.

As is evident from FIG. 7A through FIG. 7C, the placement of the tabs 48 and washers 82 on the electrode-receiving members 16 and the subsequent welds ensures that each of the electrodes is in electrical communication with the terminals on the header assembly.

In one example of a method of forming the energy storage device, the interface structure is fabricated by attaching the terminal supports 12 to the one or more insulating members 14. The feedthrough pins 20 are then inserted through openings in the insulating material 28 and then through the sleeves 24 in the cover 22. The sealants 32 can be placed on the feedthrough pins 20 after inserting the feedthrough pins 20 through the sleeves 24 or concurrently with inserting the feedthrough pins 20. The seal activator 34 can be positioned on the feedthrough pins 20. The connector 36 can then be used to form the seal between the feedthrough pins 20 and the cover 22. For instance, the connectors 36 can be used to drive the seal activators 34 into the sealant 32. Alternately, the sealant activator 34 can be pressed into the sealant 32 by a mechanical means other than the connector and the connector 36 can then be attached to the cover 22 so the connector 36 retains the sealant activator in place.

The electrode stack can be formed by sliding the electrodes and optional washers onto the electrode-receiving members 16 of the terminal supports 12. In some instances, the electrode stack is formed so cathode alternated with anodes and also with adjacent anodes and cathodes being separated by a side of a separator bag. Additionally, the tabs 48 of the anodes and cathodes are slid onto the electrode-receiving members 16 such that the anodes in the stack are in electrical communication with one of the terminal support 12 while the cathodes in the stack are in electrical communication with the other terminal support 12. As a result, one of the feedthrough pins 20 serves as a positive terminal and one of the other feedthrough pins 20 serves as a negative terminal. The stack can include three or more electrodes. In some instances, the stack includes more than 6 electrodes. After the electrode stack is formed, the weld 94 and the weld 91 can be formed.

Figure 7D:
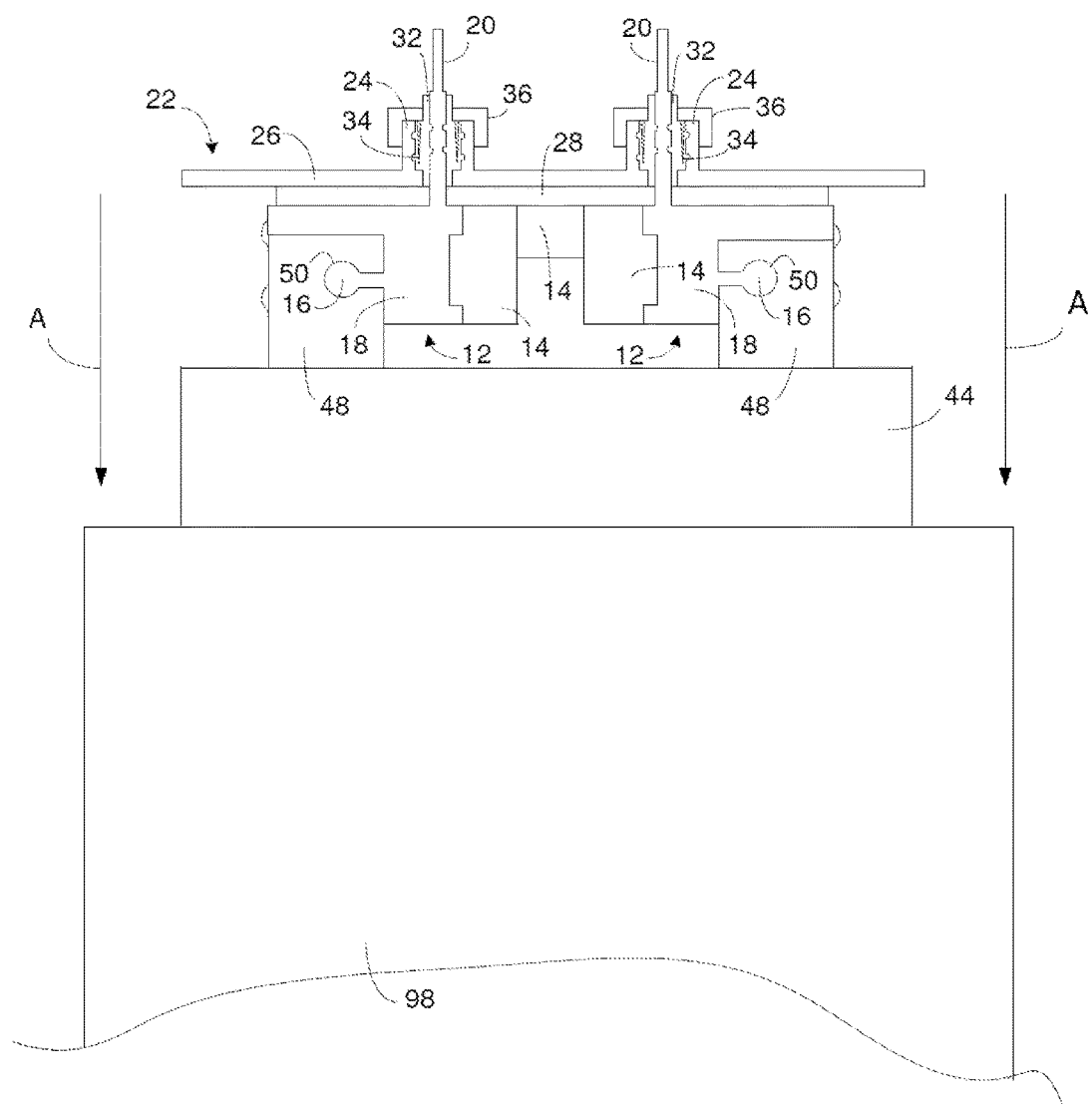

Once the electrode stack and welds have been formed, the electrochemical device can be formed as illustrated in FIG. 7D. The electrode stack is placed in the case bottom 98 as shown by the arrows labeled A. The electrode stack can be lowered into the case bottom 98 until the cover 22 rests against the rim of the case bottom 98. In some instances, the stack of electrodes can rest on one or more structures at the bottom of the case bottom. Accordingly, the bottom of the case bottom 98 can align the lower edges of the electrode systems with the lower edges of the electrodes 42 that are not positioned in a separator bag 44. An electrolyte can be injected into the case bottom between the cover 22 and the case or through an opening (not shown) in the cell cover 22. The cover 22 can then attached to the case bottom by a technique such as welding. As a result, the sealant is exposed to electrolyte within the case.

Other device assembly sequences can be employed. For instance, the electrode stack and welds can be formed on the interface structure 10. The result can be positioned in the case bottom 98 along with an electrolyte. The insulating material 28 and cover 26 can be positioned on the feedthrough pins 20 and the cover 22 attached to the case bottom. The sealant 32, seal activator 34, and connectors 36 can then be installed.

Although the energy storage device is described in the context of a battery having an anode and cathode, the battery can be a primary battery or a secondary battery. Accordingly, the anodes disclosed above can be the negative electrodes of a secondary battery and the cathode can be the positive electrodes of a secondary battery. Alternately, the device can be a device for generating and/or storing electrical energy such as a capacitor.

Although the above sealing mechanism has been disclosed in the context of energy storage devices such as batteries, the sealing mechanism can be used to provide a hermetic seal in a variety of other applications that make use of feedthrough pins that provide an electrical connection across a structure such as a case, housing, board, or substrate. For instance, the above sealing mechanism can be employed in conjunction with the feedthrough pins in electrical control panels, computer enclosures, and remote sensors.

Although the above descriptions of the header assembly discloses a plurality of electrodes positioned between each washer 82 on an electrode-receiving member, there can be as few as one electrode positioned between one or more pairs of washers 82. Further, the washers 82 are optional and in some instances, the washers 82 are not employed.

Although the seal described above is a mechanical seal generated by the sealant applying pressure to different device components, the seal can include other mechanisms to enhance the integrity of the seal. For instance, materials such as adhesives, epoxies, and/or compressible polymers can be positioned between the sealant and the case and/or between the sealant and the feedthrough pin.

Although the above description of the seal discloses a feedthrough pin extending through the cover, a feedthrough pin can extend through a different portion of the case. For instance, a feedthrough pin can extend through a sleeve in the bottom of the case 98 and the sealant can form a seal between the sleeve and feedthrough pin. Further, other components can optionally be positioned between the feedthrough pin and the sealant. For instance, a ferrule or other component can be bonded to the feedthrough pin and the sealant can be in contact with the ferrule.

Although the devices disclosed above are shown with multiple terminals that each has essentially the same interface with the device case, different terminals can have different constructions. Accordingly, the device can be constructed with a single terminal having the disclosed sealing mechanism.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. An electrical energy storage device, comprising:
    electrodes positioned in a case;
    a feedthrough pin extending through a portion of the case;
    a sealant surrounding the feedthrough pin and being in contact with a component of the device;
    a seal activator received in the sealant with sealant between the seal activator and the feedthrough pin, the seal activator increasing a level of pressure that the sealant applies to the component above the level of pressure that the sealant applies to the component without the sealant activator being received in the sealant, the seal activator and the case being distinct parts of the electrical energy storage device; and
    the feedthrough pin extending through a sleeve and the seal activator being received in the sealant such that a level of pressure that the sealant applies to the sleeve increases above the level of pressure that the sealant applies to the sleeve without the sealant activator being received in the sealant.

2. The device of claim 1, wherein the component is the feedthrough pin.

3. The device of claim 1, wherein the feedthrough pin is surrounded by the sleeve.

4. The device of claim 1, wherein the sleeve serves as the component.

5. The device of claim 1, wherein the sealant activator penetrates the sealant by a distance of more than 1 mm.

6. The device of claim 1, wherein a portion of the sealant activator received in the sealant has a wedge shape.

7. The device of claim 1, wherein the seal activator surrounds the feedthrough pin.

8. The device of claim 1, wherein a connector is connected to the case and immobilizes the sealant and seal activator at a location between the connector and the case.

9. The device of claim 8, wherein the connector is threaded onto the case.

10. The device of claim 1, wherein the case includes a cover and the feedthrough pin extends through the cover, the cover includes the sleeve and the sealant contacts both the sleeve and the feedthrough pin.

11. The device of claim 10, wherein a connector is threaded onto the sleeve.

12. The device of claim 11, wherein the connector contacts the seal activator.

13. The device of claim 1, wherein a recess extends into the sealant, the seal activator is positioned in the recess, and the recess penetrating further into the sealant than the seal activator penetrates into the sealant.

14. The device of claim 1, wherein an electrolyte in the case contacts the sealant.

15. The device of claim 1, wherein the electrodes are arranged in a stack that includes more than three of the electrodes.

16. The device of claim 1, wherein the sealant include a bottom and a top arranged such that the bottom of the sealant is located between the top of the sealant and the electrodes, the seal activator extending through the top of the sealant.

17. The device of claim 16, wherein a connector contacts the seal activator with the seal activator being between the connector and the sealant.

18. The device of claim 1, wherein the case includes a cover and the seal activator is between the connector and the cover and the connector presses the seal activator into the sealant.

19. The device of claim 18, wherein the feedthrough pin extends through the connector.

* * * * *